(12) United States Patent
Newman et al.

(10) Patent No.: US 6,761,109 B2
(45) Date of Patent: Jul. 13, 2004

(54) APPARATUS AND METHOD FOR MIXING A GAS AND A LIQUID

(75) Inventors: Michael D. Newman, Hillsborough, NJ (US); Stephen A. McCormick, Warrington, PA (US); Helmut Dresselhaus, Brookfield (AU)

(73) Assignee: The BOC Group, Inc., Murray Hill, NJ (US)

( * ) Notice: Subject to any disclaimer, the term of this patent is extended or adjusted under 35 U.S.C. 154(b) by 37 days.

(21) Appl. No.: 09/819,513

(22) Filed: Mar. 28, 2001

(65) Prior Publication Data

US 2002/0142080 A1 Oct. 3, 2002

(51) Int. Cl.$^7$ .............................. A23B 4/14; B05B 7/02
(52) U.S. Cl. ..................... 99/516; 99/534; 261/78.2; 426/320; 426/541
(58) Field of Search .................. 99/516, 534; 261/78.2; 426/94, 103, 262, 263, 268, 531, 532, 541, 312, 320

(56) References Cited

U.S. PATENT DOCUMENTS

| | | | |
|---|---|---|---|
| 5,261,949 A | 11/1993 | Schilling | 95/216 |
| 5,337,962 A | 8/1994 | Erb et al. | 239/424.5 |
| 5,345,079 A | 9/1994 | French et al. | 250/288 |
| 5,372,754 A | 12/1994 | Ono | 261/142 |
| 5,431,736 A | 7/1995 | Boer | 118/726 |
| 5,440,887 A | 8/1995 | Nishizato et al. | 62/50.7 |
| 5,461,695 A | 10/1995 | Knoch | 392/394 |
| 5,495,893 A | 3/1996 | Roberts et al. | 169/37 |
| 5,509,405 A | 4/1996 | Mashak | 128/203.12 |
| 5,636,626 A | 6/1997 | Bloch et al. | 128/203.12 |
| 5,693,267 A | 12/1997 | Beshore et al. | |
| 5,735,468 A | 4/1998 | Casey | 239/425 |
| 5,810,252 A | 9/1998 | Pennamen et al. | 239/8 |
| 5,901,271 A | 5/1999 | Benzing et al. | 392/387 |
| 5,906,794 A | 5/1999 | Childers | 422/28 |
| 5,922,247 A | 7/1999 | Shoham et al. | 261/78.2 |

FOREIGN PATENT DOCUMENTS

| | | | |
|---|---|---|---|
| DE | 740 513 C | 10/1943 | |
| DE | 950 026 C | 10/1956 | |
| DE | 19836913 | 2/2000 | B01F/3/00 |
| EP | 0 600 503 A1 | 6/1994 | C23C/16/44 |
| EP | 0 899 017 A1 | 3/1999 | B05B/7/06 |
| EP | 0 911 053 A2 | 4/1999 | A61M/16/18 |
| EP | 0 923 985 A | 6/1999 | |
| EP | 0 939 145 A1 | 9/1999 | C23C/16/44 |
| WO | 94/27431 | 12/1994 | A01M/13/00 |

OTHER PUBLICATIONS

Cepeda, Minerva, et al., *Effects of Leavening Acids and Dough Temperature in Wheat Flour Tortillas*, American Association of Cereal Chemists, Inc., pp. 489–494, vol. 77, No. 4, 2000.

XP–002205630, Derwent Publications, Ltd., London, GB, AN 1982–359773 & JP 57 050874 A, Mar. 25, 1982, Abstract.

XP–002205631, Derwent Publications, Ltd. London, GB AN 1988–145617 & SU 1 346 218A, Oct. 23, 1987, Abstract.

European Search Report, Jul. 11, 2002.

*Primary Examiner*—Leslie Wong
(74) *Attorney, Agent, or Firm*—Joshua L. Cohen

(57) ABSTRACT

An apparatus and method are provided for mixing a gas and a liquid to produce a gaseous vapor of the liquid that is substantially free of droplets. Gas, e.g., carbon dioxide, is divided into first and second streams. The first stream is combined in an atomization zone with the liquid, e.g., acetic acid, to form an atomized mixture of the gas and liquid. This atomized mixture is then contacted with the second gas stream in a mixing zone within a mixing/separation chamber in which the second gas stream vaporizes substantially all of the atomized liquid, and the resulting mixture of gas, vaporized liquid and residual droplets moves to the separation zone of the mixing/separation chamber. In the separation zone, the residual droplets gravitationally separate from the vaporized mixture, and the vaporized mixture free of a substantial amount of residual droplets is removed from the chamber. A vaporized mixture of carbon dioxide and acetic acid is useful as, among other things, a preservative for perishable products, e.g., baked goods.

8 Claims, 5 Drawing Sheets

APPARATUS AND METHOD FOR MIXING A GAS AND A LIQUID

BACKGROUND OF THE INVENTION

This invention relates to an apparatus and method for mixing a gas and a liquid. In one aspect, this invention relates to an apparatus and method for mixing a carrier gas with an atomized liquid while in another aspect, this invention relates to the formation of a mixture of carrier gas and vaporized liquid with little, if any, entrained droplets. In yet another aspect, the invention relates to an apparatus and method for applying a preservative to a perishable product.

The preservation of perishable products has been and continues to be the focus of considerable commercial interest. By extending the shelf life of a food product, e.g., a baked good, considerable economic value can be added to that product. Approaches to this end are many and varied, e.g., tight control of storage conditions, packaging, post and in situ applications of preservatives, and various combinations of these and other techniques are known and in practice to one extent or another.

In the context of baked goods, e.g., muffins, crumpets, scones, bagels, cookies, breads, etc., all of these techniques are in use, e.g., frozen or refrigerated storage, anaerobic packaging, and the addition of preservatives either to the batter or mix from which the baked good is prepared, or the application of a preservative to the finished baked good. With respect to the latter, the application of a small amount of acetic acid to a finished baked good, e.g., a crumpet, can extend the shelf life of the baked good from a typical 6–8 days to an extended 14–16 days (all other conditions, e.g., packaging, storage conditions, etc., being equal). One problem, however, in the application of a preservative to a food product is to apply the preservative in a manner that does not interfere with the natural sensient properties of the product, e.g., taste, smell, texture, etc. In the case of applying acetic acid to a finished baked product, too much acetic acid can impart an unwanted tartness to the product.

Another problem with the application of a preservative to the finished baked good is consistent application of the preservative in a production line setting. Commercially distributed baked goods, along with most other commercially manufactured and distributed perishable goods, are made in large quantities, and consistency from one item to the other is important to the commercial success of the product line. In the case of applying acetic acid to baked goods, the amount of acetic acid applied to the first baked good in the production cycle should be essentially the same as the amount of acetic acid applied to the last item in the production cycle (and all items throughout that production cycle, for that matter). This can be difficult to control over extended periods of time due to, among other things, variations in the temperature of the equipment, the preparation and delivery of the acetic acid to the finished product, and the like.

For example, the application of acetic acid as a preservative to a finished baked good typically begins with the conversion of liquid acetic acid to gaseous acetic acid. This conversion is accomplished by any one of a number of different procedures, e.g., flash evaporation, atomization, etc., and the gaseous acetic acid is then transported, typically by a carrier gas, e.g., carbon dioxide, to a treatment chamber. Finished baked goods are fed on a batch basis to the chamber in which they are exposed under predetermined conditions to the acetic acid, removed from the chamber, and then the cycle repeats. One common problem with this technique is that the gaseous acetic acid often has entrained within it small droplets of liquid acetic acid and these droplets, when deposited on the finished baked good, can constitute an overdose of preservative and impart a tartness to the product. The droplets originate from either incomplete vaporization of the acetic acid and/or as a condensate from the gaseous acetic acid as it is transported from a vaporization zone to the treatment chamber. Similar problems exist, of course, with the application of other gaseous preservatives to other perishable products.

SUMMARY OF THE INVENTION

According to this invention, an apparatus and method is provided for mixing a gas and a liquid to produce a gaseous vapor of the liquid that is substantially free of droplets. The apparatus and method are well adapted to converting a preservative from a liquid to a gaseous state for application to a perishable product.

In one embodiment, the invention is an apparatus for mixing a gas and a liquid to form a gaseous mixture substantially free of droplets, the apparatus comprising:

A. A source of the gas;

B. A source of the liquid;

C. An atomization nozzle;

D. An antechamber;

E. An orifice plate; and

F. A mixing/separation chamber.

The atomization nozzle is in fluid communication with both the source of the gas and the source of the liquid, the liquid atomized by the gas within the atomization nozzle to form an atomized mixture of the gas and the liquid. The antechamber is (i) in fluid communication with the source of the gas, and (ii) in fluid communication with and separated from the mixing/separation chamber by an orifice plate. The orifice plate comprises one or more orifices through which the gas can pass from the source of the gas, through the antechamber, and into the mixing/separation chamber. The atomization nozzle extends through the antechamber and the orifice plate, and is in open communication with the mixing/separation chamber such that the atomized mixture of the gas and the liquid is discharged into the mixing/separation chamber.

The mixing/separation chamber comprises a housing having an upper section and a lower section. The upper section is in open communication with both the atomization nozzle and the antechamber, and the lower section is equipped with an exit port. The atomization nozzle and orifice plate are configured to form a mixing zone within the upper section of the mixing/separation chamber such that as the atomized mixture of gas and liquid is discharged into the upper section of the chamber, gas from the antechamber passes through the orifices of the orifice plate so as to impinge upon and vaporize substantially all, if not all, of the liquid component of the atomized mixture of gas and liquid. The vaporized mixture of the gas and the vaporized liquid then moves into the remainder of the chamber, i.e., the separation zone of the chamber, in which any residual droplets separate gravitationally from the vaporized mixture. The residual or unvaporized droplets settle onto the floor of the chamber from which they are either removed through a drain, or vaporized if the appropriate conditions exist within the separation zone, e.g., the floor of the chamber is heated to a sufficient temperature to vaporize the droplets. The exit port located in the lower section of the mixing/separation chamber is in sealed relationship with a discharge conduit for the discharge of the vaporized mixture free of a substantial amount of residual droplets. The conduit extends from the exit port into and is in open communication with the upper section of the mixing/separation chamber. As here used, "in sealed relationship" means that the discharge conduit is joined to the exit port in such a manner that the vaporized mixture can enter the conduit only from the upper section of the chamber, and it can be removed from the chamber only by passing through the conduit.

In another embodiment, the invention is a method for mixing a gas and a liquid to form a gaseous mixture substantially free of droplets, the method comprising the steps of:

A. Separating the gas into a first gas stream and a second gas stream;

B. Mixing the first gas stream with the liquid in an atomization zone under conditions in which the liquid is atomized by the gas to form an atomized mixture comprising a gas component and a liquid component, the liquid component in atomized or small droplet form;

C. Mixing the atomized mixture with the second gas stream in a mixing zone under conditions in which the liquid component of the atomized mixture is substantially vaporized to form a vaporized mixture of the gas and vaporized liquid, the vaporized mixture containing residual amounts of the liquid in droplet form;

D. Gravitationally separating the residual liquid droplets from the vaporized mixture in a separation zone; and E. Recovering the vaporized mixture free of a substantial amount of residual droplets from the separation zone.

Typically, the mixing and separation zones are within the mixing/separation chamber previously described.

In yet another embodiment, the invention is a mixing and separation chamber for (i) preparing a gaseous mixture comprising (a) first and second gases, and (b) droplets of the second gas, and then (ii) separating the residual droplets from the first and second gases, the chamber comprising:

A. A housing having an upper section and a lower section, the upper section equipped with an entry port for receiving the first gas and an atomized mixture of the first gas and droplets of the second gas in such a manner that the first gas and the atomized mixture are in contact with one another upon their immediate entry into the upper section of the chamber, the contacting producing the gaseous mixture, and the lower section equipped with an exit port; and B. A discharge conduit for removing the gaseous mixture free of a substantial amount of the residual droplets from the housing, the discharge conduit in a sealed relationship with the exit port and extending into the upper section of the housing.

In still another embodiment, the invention is a method of separating droplets from a vaporized mixture comprising first and second gases and droplets of the second gas, the method comprising the steps of:

A. Providing a mixing/separation chamber, the chamber comprising:

1. A housing having an upper section and a lower section, the upper section equipped with an entry port and the lower section equipped with an exit port;

2. A discharge conduit for removing from the housing the vaporized mixture free of a substantial amount of the droplets, the discharge conduit in a sealed relationship with the exit port and extending into the upper section of the housing;

B. Maintaining the chamber at a temperature above the vaporization temperature of the gases of the vaporized mixture;

C. Creating the vaporized mixture in the upper section of the housing in a mixing zone adjacent the entry port;

D. Allowing the droplets to gravitationally separate from the vaporized mixture in a separation zone of the chamber, the droplets accumulating in the lower section of the housing and the vaporized mixture free of a substantial amount of the droplets circulating throughout the separation zone; and E. Removing the vaporized mixture free of a substantial amount of the droplets from the housing through the discharge conduit and exit port.

In another embodiment, the invention is a method of extending the shelf life of a perishable product having an external surface, the method comprising the steps of:

A. Preparing the product; and

B. Applying a vaporized preservative substantially free of droplets to the external surface of the product, the vaporized preservative prepared by a method comprising the steps of:

1. Separating a carrier gas into a first gas stream and a second gas stream;

2. Mixing the first gas stream with a liquid preservative under conditions in which the liquid is atomized by the gas to form an atomized mixture comprising the carrier gas and the liquid preservative, the preservative in droplet form;

3. Mixing the atomized mixture with the second gas stream under conditions in which the liquid preservative is substantially vaporized to form a vaporized mixture of the carrier gas, the vaporized preservative and residual droplets of the preservative; and 4. Separating the residual droplets from the vaporized mixture in a separation zone, the zone comprising:

a. A housing having an upper section and a lower section, the upper section equipped with an entry port and the lower section equipped with an exit port;

b. A discharge conduit for removing the vaporized mixture free of any significant amount of residual droplets from the housing, the discharge conduit in a sealed relationship with the exit port and extending into the upper section of the housing, the residual droplets gravitationally separated from the carrier gas and preservative vapor within the housing.

The present invention is especially well adapted for mixing gaseous carbon dioxide with liquid acetic acid to form a gaseous mixture of carbon dioxide and acetic acid which is substantially free of droplets, the gaseous mixture useful as a preservative for perishable goods, especially baked products.

As used in this specification, "free of a substantial amount of residual droplets" and like phrases means that whatever amount of residual droplets that remain in the vaporized mixture of gas (e.g., $CO_2$) and vaporized liquid (e.g., acetic acid) after the mixture is recovered from the mixing/separation chamber, it is not enough to have a detrimental impact on the ultimate end use of the vaporized mixture. For example, if the residual droplets are acetic acid, the vaporized mixture is gaseous $CO_2$ (as a carrier gas) and vaporous acetic acid, and its ultimate end use is as a preservative for baked goods, then the amount of residual droplets in the vaporized mixture is insufficient to have a detrimental impact on the sensient properties of the baked goods, as perceived by a typical consumer, after the goods are treated with the vaporized mixture in standard fashion.

DESCRIPTION OF THE PREFERED EMBODIMENTS

Various embodiments of the invention are described by reference to the drawings in which like numerals are employed to designate like parts. Various items of equipment, such as fittings, valves, mountings, pipes, sensors, monitoring equipment, wiring and the like have been omitted to simplify the description. However, such conventional equipment and its use are known to those of skilled in the art, and can be employed as desire. Moreover, although the invention is described below in the context of mixing carbon dioxide and acetic acid for application as a preservative to baked goods, those skilled in the art will recognized that the invention has applicability to many different gas and liquid combinations for a wide variety of uses.

Figure 1A:
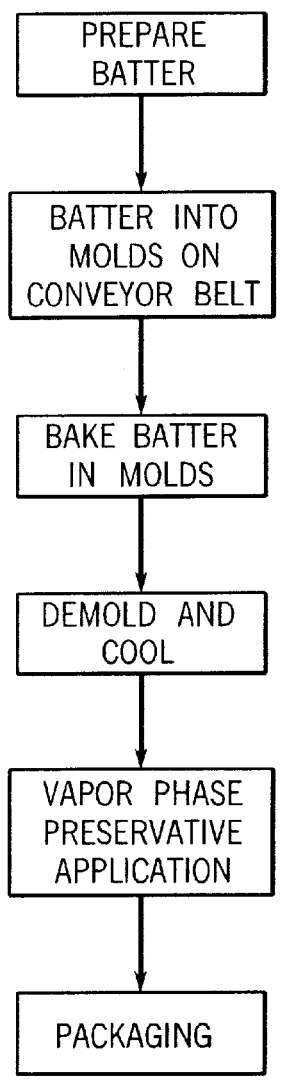
FIG. 1A is a schematic flow diagram of one embodiment of the process to make a baked product, e.g., a crumpet.

FIG. 1A is a broad description for the preparation of commercial quantities of a baked good, e.g., a crumpet. Batter is prepared, and then it is poured into molds that are either carried on or form a part of a continuous conveyor belt. The belt moves the batter through a baking zone in which the batter is fully baked. Upon leaving the baking zone, the crumpet is demolded, typically onto another conveyor belt.

Figure 1B:
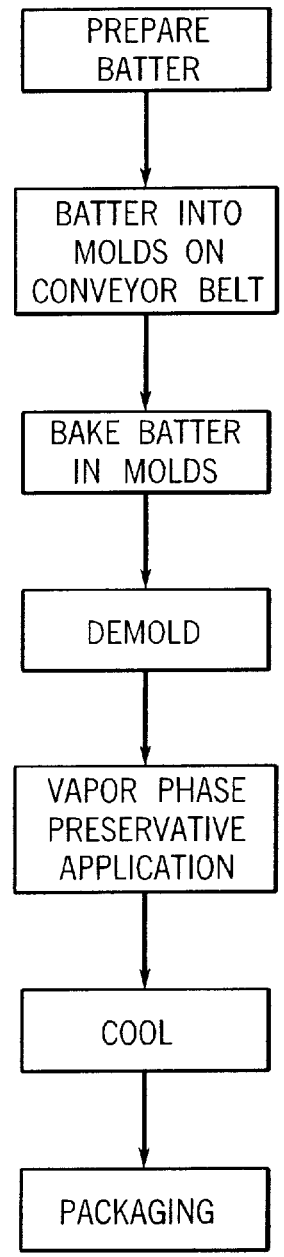
FIG. 1B is a schematic flow diagram of an alternative embodiment of the process to make a baked product.

The demolded crumpets are then conveyed through a cooling tunnel after which the crumpets are at a temperature appropriate for packaging (e.g., room temperature or slightly above). However according to one embodiment of this invention, before packaging the crumpets pass through a treatment chamber in which a preservative is applied to their external surface. In another embodiment and as described in FIG. 1B, the cooling and preservative stations are reversed, i.e., after demolding the crumpets are treated with a preservative, cooled and then packaged.

The treatment chamber is essentially a movable hood in combination with a base. The hood can be manipulated, e.g., raised and lowered, in such a manner that goods to be treated are easily inserted and removed from the volume defined by the hood and base when both are in a closed relationship with one another. The hood is equipped with an entry port for receiving the vaporized mixture. The treatment chamber base is typically a section of conveyor belt beneath which is a platen. The hood closes over the base in a manner that will permit a vacuum to be drawn within the chamber. In another embodiment, the treatment chamber is separate and apart from the conveyor belt, and this requires a transfer of the crumpets from the belt and into the chamber for treatment.

Figure 2:
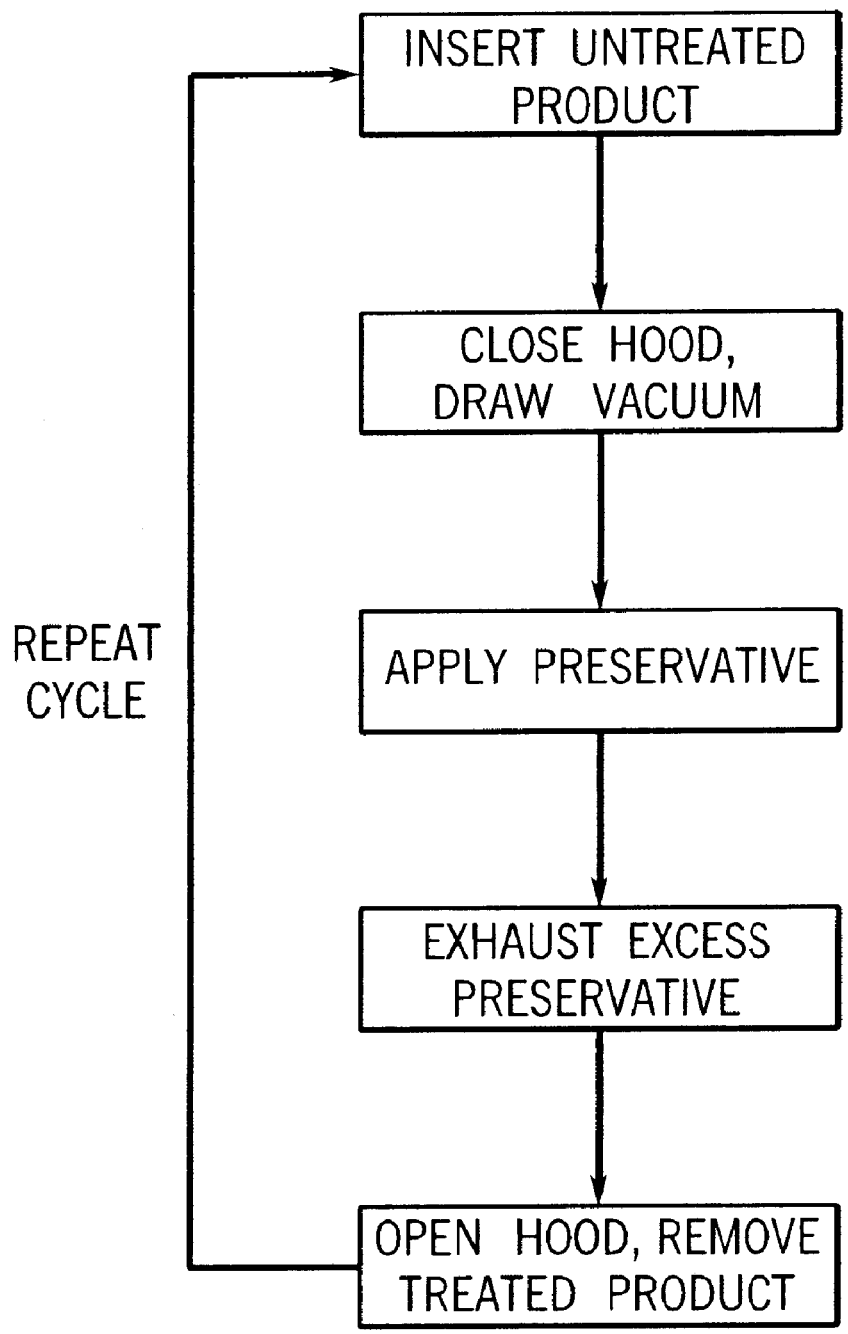
FIG. 2 is a schematic flow diagram of one embodiment of a batch operation of a treatment chamber.

FIG. 2 describes a typical batch operation. The chamber of this example operates on a 25–30 second cycle. First the hood is raised and the crumpets are transferred from an indexing conveyor onto a conveyor within the chamber. Next the hood is lowered and sealed against the treatment chamber base, typically a platen underneath the conveyor on which the crumpets are positioned. The seal between the hood and the platen is sufficient to allow a vacuum to be drawn. The atmosphere, e.g., air, in the sealed chamber is evacuated, the preservative fed into the evacuated chamber to coat onto and/or penetrate into the external surface of the crumpets, the excess preservative exhausted, the hood raised, the treated product removed, and then the cycle repeated. The construction and operation of various embodiments of the treatment chamber are well known to those skilled in the art.

The preservative applied to the crumpets in the treatment chamber is acetic acid. This acid is in the gaseous state when applied, and it is admixed with a carrier gas, e.g., gaseous carbon dioxide. The amount of acetic acid applied to the crumpets is important to both the effectiveness of the preservative and the sensient properties of the crumpet. Not enough acetic acid, and the preservative has little, if any, effect. Too much acetic acid, and the preservative imparts an unwanted tartness to the crumpet. While the amount of preservative applied to the crumpet will vary with a host of considerations, e.g., the nature of the baked item, the length of time to which the baked item is exposed to the preservative, conditions (e.g., pressure, temperature, carrier gas, etc.) of the treatment chamber, and the like, typically acetic acid in the amount of about 0.25 weight percent based upon the combined weight of the acetic acid and carbon dioxide is sufficient when applied under vacuum conditions (e.g., −90 to −100 kpa) over a period of about 10–15 seconds. In order to maintain consistency over an extended period of production, the gaseous acetic acid should be substantially free of acetic acid droplets. These droplets are of minute size (e.g., one micron or less), and the total droplet content of the treatment gas (carbon dioxide plus vaporous acetic acid) is typically less than about 1, preferably less than about 0.25, weight percent.

Figure 3:
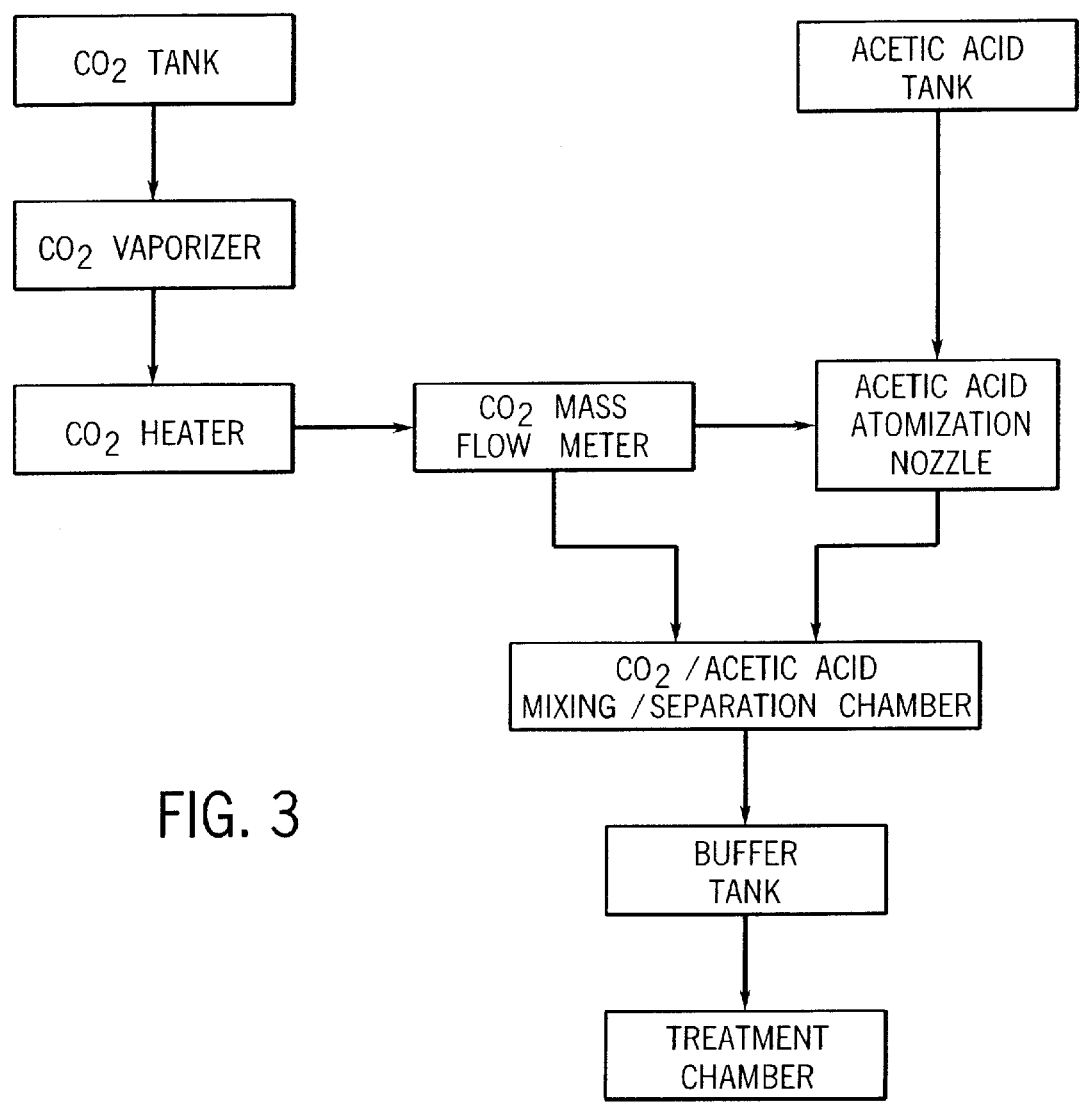
FIG. 3 is a schematic flow diagram of an embodiment of a process for mixing gaseous carbon dioxide with liquid acetic acid to form a vaporous mixture of carbon dioxide and acetic acid which is substantially free of acetic acid droplets.

FIG. 3 provides a generic description of the process by which the acetic acid is diluted and vaporized with, and carried by, carbon dioxide. In a typical embodiment, commercially available liquid carbon dioxide is used as the carbon dioxide source. It is vaporized, heated and then transferred to a mass flow meter in which it is divided into two streams. One stream is used to atomize liquid acetic acid drawn from a holding tank into a fine spray. This atomized or spray of acetic acid is then transferred to a mixing/separation chamber in which it is contacted with a second stream of carbon dioxide. In the mixing/separation chamber, the acetic acid is vaporized, preferably to the point that little, if any, liquid acetic acid in spray (fine droplet) form remains. The gaseous mixture of carbon dioxide and vaporized acetic acid (along with any residual acetic acid droplets) are then transferred to a buffer tank, and from the buffer tank to the treatment chamber.

The buffer tank is important to the embodiment of the invention in which the treatment chamber is operated on a batch basis. The buffer tank serves as a reservoir from which the gaseous mixture of carbon dioxide and acetic acid can be continuously received while it is only periodically discharged into the treatment chamber. If the treatment chamber is operated on a continuous basis, then the buffer tank can be eliminated, i.e., the gaseous mixture of carbon dioxide and acetic acid can be transferred directly to the treatment chamber.

Figure 4:
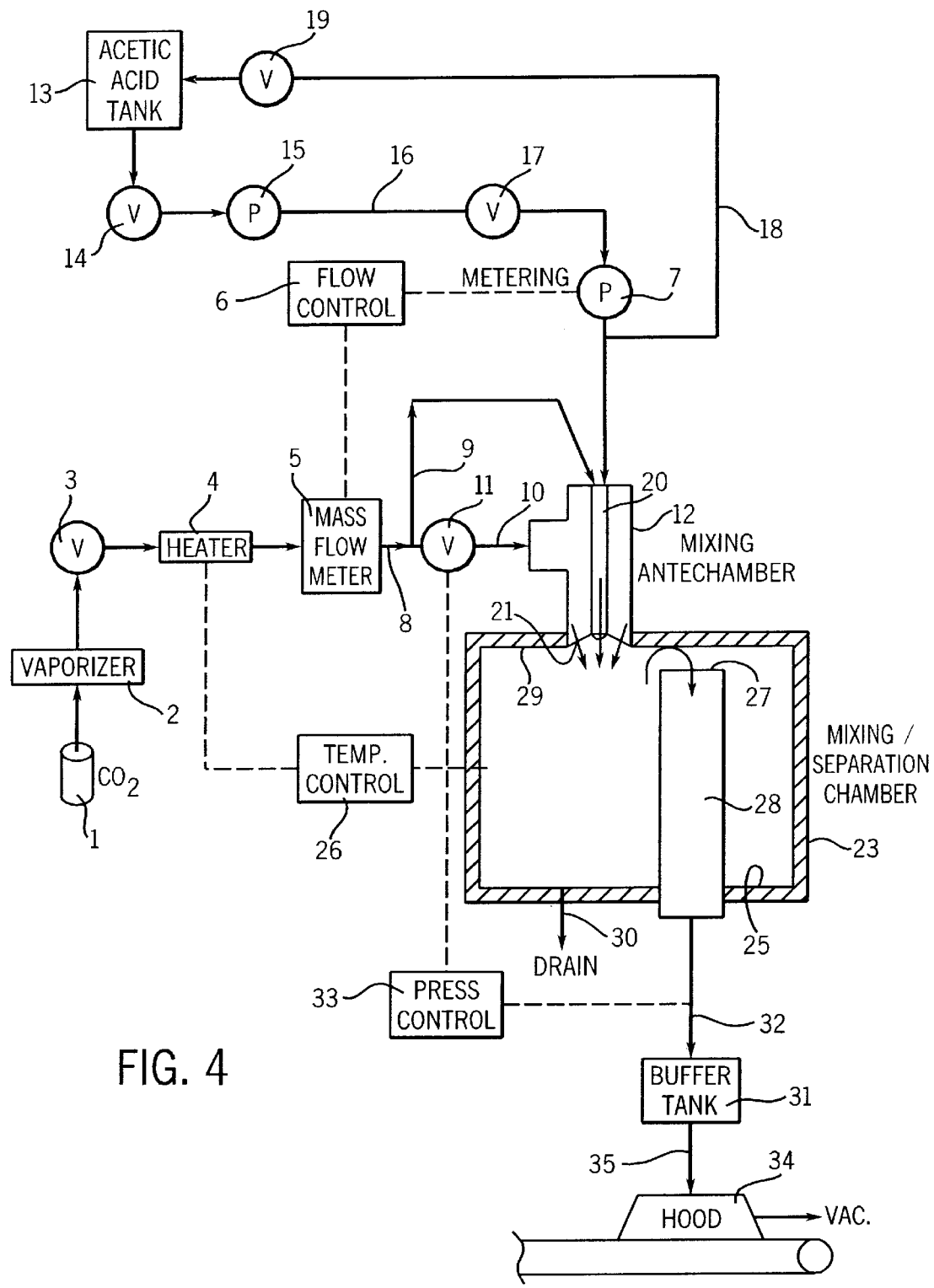
FIG. 4 is a more detailed schematic flow diagram of FIG. 3.

FIG. 4 describes in more detail the process described in FIG. 3. Tank 1 holds liquid carbon dioxide, typically at about 300 psig. Liquid carbon dioxide is transferred to vaporizer 2 in which it is converted to a gas essentially free of any droplets, and then the gas is passed through pressure reduction valve 3 in which the pressure is dropped from 300 psig to 100 psig. The gaseous $CO_2$ is then transferred to heater 4 in which it is heated to essentially the same temperature as that of the contents of mixing/separation chamber 23 (e.g., 140° F.). Temperature control unit 26 coordinates the temperature of heater 4 and of chamber 23. From heater 4, the gaseous carbon dioxide at 100 psig is transferred to mass flow meter 5, which is controlled by flow control 6. As long as pump 7 (the utility of which is explained later) is in proper operation, flow control 6 allows carbon dioxide to move from mass flow meter 5 into pipe 8. Pipe 8 divides into pipes 9 and 10. While the amount of carbon dioxide each of pipes 9 and 10 will carry can vary to convenience, typically pipe 9 will carry about 10 weight percent and pipe 10 will carry the remaining about 90 weight percent of the carbon dioxide. The stream of carbon dioxide passing through in pipe 10 also passes through control valve 11 before entering mixing antechamber 12.

Liquid acetic acid is removed from tank 13 through check valve 14 by the action of pump 15. The liquid acetic acid moves through lines 16, valve 17 into metering pump 7. If atomization nozzle 20 is operational, then the liquid acetic acid is fed into atomization nozzle 20 in which it is atomized with carbon dioxide delivered to the nozzle through line 9. If atomization nozzle 20 is not operative, then the liquid acetic acid is returned to tank 13 by way of line 18 and check valve 19.

Atomized acetic acid is transferred from atomization nozzle 20 into the upper section of mixing/separation chamber 23 in which it is vaporized by contact with carbon dioxide delivered from mixing antechamber 12 through orifice plate 21. The carbon dioxide delivered from line 10 into antechamber 12 passes through pressure reduction valve 11 in which the pressure of the carbon dioxide is reduced from 100 psig to about 5 psig. The pressure of the atomized acetic acid as delivered to mixing/separation chamber 23 is also about 5 psig. The temperature, pressure and volume of carbon dioxide introduced into the upper section of mixing/separation chamber 23 is sufficient such that the atomized acetic acid is essentially completely vaporized upon contact with it.

Atomization nozzle 20 passes through antechamber 12 and orifice plate 21, and it opens into the upper section of mixing/separation chamber 23. Atomization nozzle 20 can extend into the upper section of mixing/separation chamber 23 any convenient length, but typically the end of the nozzle is flush with or extends only a short distance beyond orifice plate 21.

Figure 5:
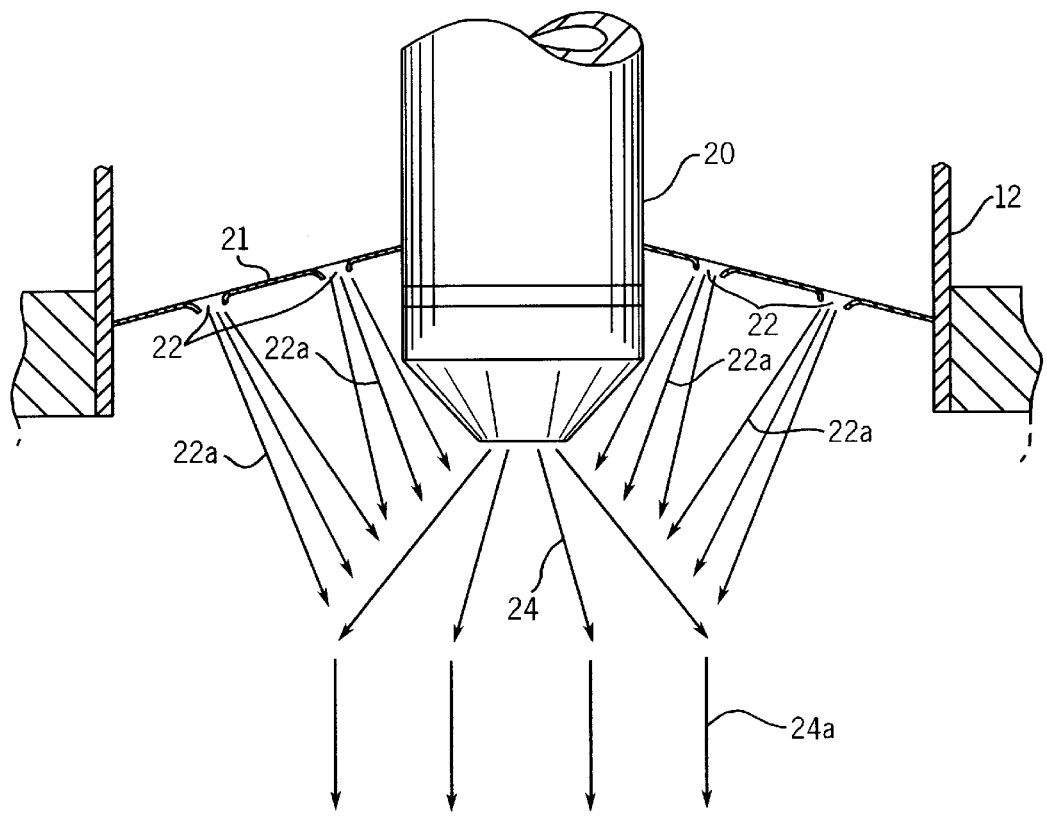
FIG. 5 is an enlarged schematic of the mixing zone of FIG. 4.

Referring to FIG. 5, orifice plate 21 separates antechamber 12 from the upper section of mixing/separation chamber 23, and it encircles the lower end of atomization nozzle 20. Typically, orifice plate 21 is located in the entry port of chamber ceiling or top wall 29, and it is angled in such a manner that orifices 22 are slanted in the direction of atomized mixture spray 24. The number, size and position of the orifices in the orifice plate can vary to convenience. In a preferred embodiment, orifice plate 21 is heated.

Carbon dioxide gas moves under a positive pressure from antechamber 12 onto spray 24, which is discharged from the end of atomization nozzle 20. The area in the upper section of mixing/separation chamber 23 in which carbon dioxide gas 22a impinges upon spray 24 is the mixing zone of the chamber. The remainder of mixing/separation chamber 23 is the separation zone, which includes virtually all of the lower section of the chamber. Within the mixing zone, the atomized acetic acid is vaporized into gaseous acetic acid and residual acetic acid droplets.

Referring again to FIG. 4, the residual acetic acid droplets separate gravitationally from the mixture of gaseous carbon dioxide and acetic acid as this mixture circulates about the separation zone of chamber 23. Eventually the residual acetic acid droplets collect on floor 25 of chamber 23. In a preferred embodiment, floor 25 is heated to promote evaporation of the collected residual acetic acid droplets. Alternatively or in combination with the heated floor, the residual acetic acid droplets are continuously or periodically withdrawn from chamber 23 through drain 30.

Mixing/separation chamber 23 is made of any conventional material, is well insulated, and is constructed to hold a positive pressure, e.g., between about 5–20 psig. Chamber 23 is equipped with a temperature sensor (not shown) which is connected to temperature control 26 which in turn is connected to heater 4. Temperature control 6 adjusts heater 4 to raise the temperature of the carbon dioxide fed into antechamber 12 so as to maintain a desired temperature, e.g., 140° F., in mixing/separation chamber 23. Chamber 23 is also equipped with a pressure sensor and pressure relief valve (both of which are not shown). Chamber 23 can also be equipped with a pressure sensor (not shown) that can relay information to pump 7 and/or mass flow meter 5.

Despite the effectiveness of the design of the mixing zone, some small amount of residual droplets of acetic acid usually pass into the separation zone of chamber 23. This mixture of gaseous carbon dioxide and acetic acid and residual acetic acid droplets is under a positive pressure and as such, it disburses throughout the internal volume of chamber 23 (except the mixing zone, of course, which itself is under positive pressure from both the mixture ejected from the atomization nozzle and the carbon dioxide ejected from the antechamber). This positive pressure eventually forces the gaseous acetic acid free of a substantial amount of the residual droplets through entrance port 27, into and though exit conduit 28, and eventually out of chamber 23. Since entrance port 27 of discharge conduit 28 is located in the upper section, preferably near ceiling 29 of chamber 23, most, if not all, of the residual droplets of acetic acid have separated from the gaseous mixture due to the influence of gravity. These droplets will condense on the internal walls of chamber 23 and the external walls of exit conduit 28, eventually collecting on floor 25.

Because the vaporization of liquid acetic acid with gaseous carbon dioxide is conducted on a continual basis while the application of the gaseous mixture of carbon dioxide and vaporous acetic acid is applied to the perishable product on a batch basis, buffer tank 31 is employed. The gaseous mixture discharged from exit conduit 28 is transferred to buffer tank 31 by line 32 on a continuous basis. Line 32 is equipped with a pressure sensor (not shown) that relays pressure information to pressure control 33 which in turn feeds pressure information to check valve 11. If pressure in line 32 builds beyond a predetermined set point, this information is relayed to pressure control 33, which in turn closes check valve 11, thus stopping flow of carbon dioxide into mixing chamber 12.

Buffer tank 31 is designed to hold a positive pressure of the gaseous mixture of carbon dioxide and vaporous acetic acid, and this pressure is, of course, less than that of line 32 so that the gaseous mixture continuously flows into buffer tank 31 from mixing/separation chamber 23. As treatment chamber or hood 34 requires a gaseous mixture for treatment of perishable product (not shown), the gaseous mixture is transferred from buffer tank 31 through line 35 into treatment chamber 34. The transfer is a result of both the push of the positive pressure in tank 31 and the pull of the vacuum in treatment chamber 34. A regulator (not shown) controls the amount of gaseous mixture transferred from buffer tank 31 to treatment chamber 35. Typically, buffer tank 31 is designed to hold a pressure of the gaseous mixture of carbon dioxide and vaporous acetic acid at a volume of at least 10 times that of the vacuum drawn in treatment chamber 34. Typically, the pressure within the buffer tank never drops below 3 psig during the cycle of the treatment chamber. The buffer tank, and all reticulation between the buffer tank and treatment chamber, is maintained at a temperature well above the vaporizing temperature of the acetic acid.

In another embodiment of the invention, the treatment chamber is operated at atmospheric pressure, i.e., without a vacuum. Products that are less porous than a crumpet (or simply not porous) will likely benefit little from the application of a preservative under vacuum conditions. For such products, the chamber can be operated at ambient or atmospheric pressure, and the transfer of the mixture of acetic acid and carbon dioxide from the buffer tank to the treatment chamber will be effected primarily, if not solely, by the positive pressure maintained in the buffer tank.

Although the invention has been described in considerable detail through the proceeding embodiments, this detail is for the purpose of illustration. Many variations and modifications can be made without the departing from the spirit and scope of the invention as described in the appended claims.

What is claim is:

1. An apparatus for mixing a gas and a liquid to form a gaseous mixture substantially free of droplets, the apparatus comprising:
    A. A source of the gas;
    B. A source of the liquid;
    C. An atomization nozzle;
    D. An antechamber;
    E. An orifice plate; and
    F. A mixing/separation chamber;

the atomization nozzle in fluid communication with both the source of the gas and the source of the liquid, the antechamber (i) in fluid communication with the source of the gas, and (ii) in fluid communication with and separated from the mixing/separation chamber by the orifice plate, and the atomization nozzle extending through the antechamber and the orifice plate, and in open communication with the mixing/separation chamber.

2. The apparatus of claim 1 in which the mixing/separation chamber comprises an upper section and a lower section, the upper section comprising a top wall having an entry port in which is fitted the orifice plate, and the lower section comprising a bottom wall having an exit port.

3. The apparatus of claim 2 in which the exit port is in a sealed relationship with a conduit that extends into the upper section of the chamber.

4. The apparatus of claim 2 in which the bottom wall is further equipped with a drain.

5. The apparatus of claim 1 in combination with a buffer tank, the buffer tank comprising (i) a housing, (ii) an entry port, and (iii) an exit port, the buffer tank coupled to the chamber by a conduit extending from the exit port of the chamber to the entry port of the buffer tank.

6. The apparatus of claim 5 in further combination with a treatment chamber, the treatment chamber comprising a (i) a hood with an entry port, and (ii) a base, the treatment chamber coupled to the buffer tank by a conduit extending from the exit port of the buffer tank to the entry port of the hood.

7. A mixing and separation chamber for (i) preparing a gaseous mixture comprising (a) first and second gases, and (b) droplets of the second gas, and then (ii) separating the residual droplets from the first and second gases, the chamber comprising:
    A. A housing having an upper section and a lower section, the upper section comprising a top wall equipped with an entry port for receiving the first gas and an atomized mixture of the first gas and droplets of the second gas in such a manner that the first gas and the atomized mixture are in contact with one another upon their entry into the upper section of the chamber, the contacting producing the gaseous mixture, and the lower section equipped comprising a bottom wall equipped with an exit port; and
    B. A discharge conduit for removing the gaseous mixture free of a substantial amount of the residual droplets from the housing, the discharge conduit in a sealed relationship with the exit port and extending into and in open communication with the upper section of the housing.

8. The chamber of claim 7 in which the bottom wall is further equipped with a drain.

* * * * *